Sept. 5, 1950     McKENZIE A. BEARD     2,521,562
HIT-AND-RUN DETECTOR
Filed Aug. 8, 1947     3 Sheets-Sheet 1
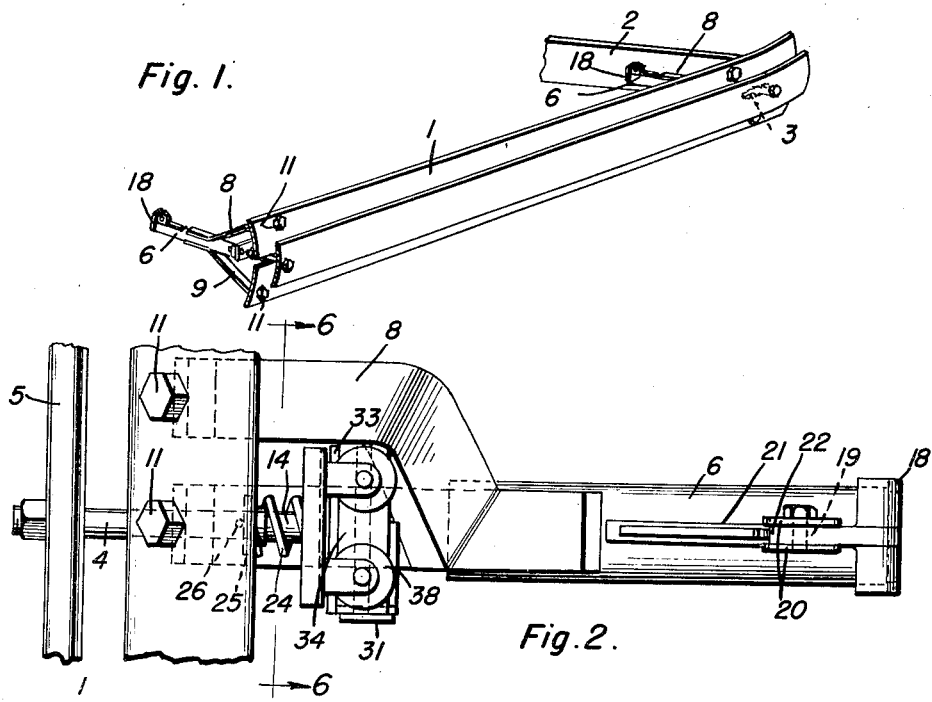
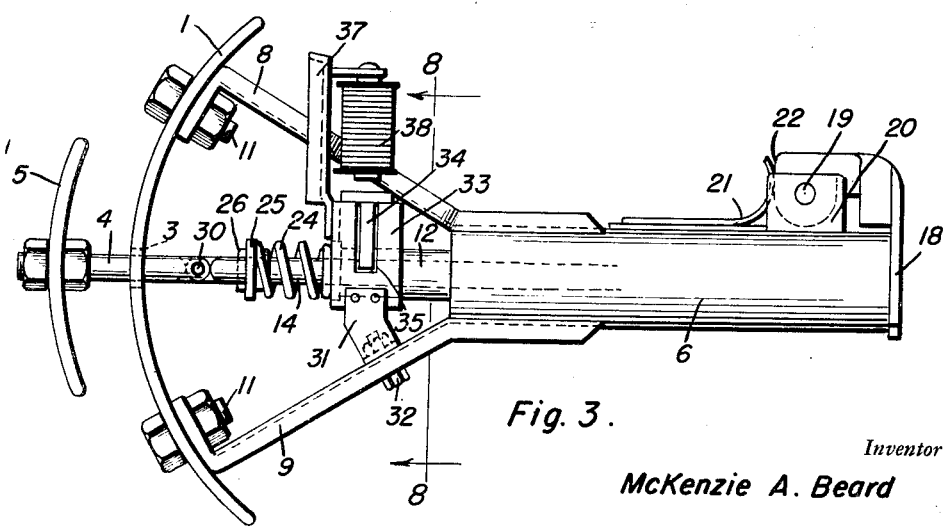
Inventor
McKenzie A. Beard
By Clarence A. O'Brien
and Harvey B. Jacobson
Attorneys Sept. 5, 1950 McKENZIE A. BEARD 2,521,562
HIT-AND-RUN DETECTOR
Filed Aug. 8, 1947 3 Sheets-Sheet 2
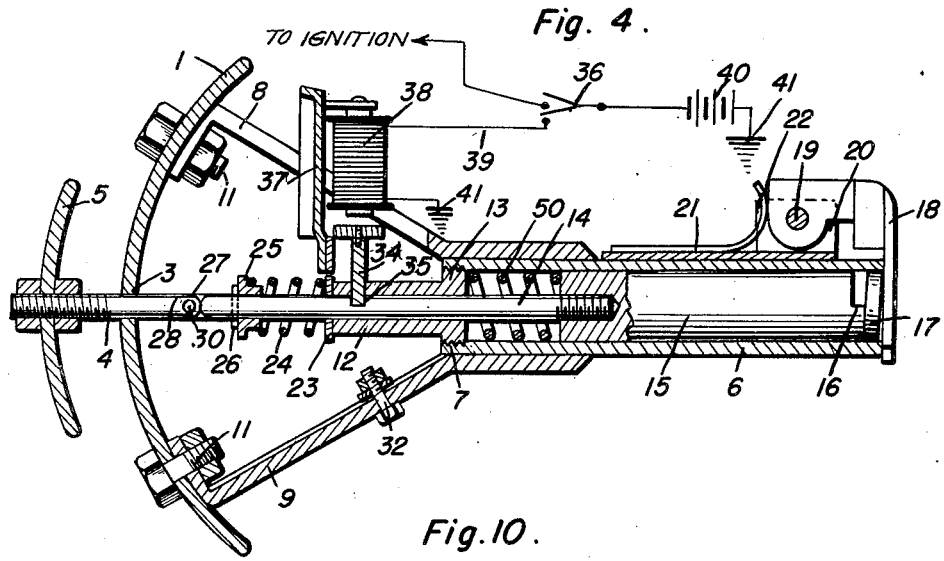
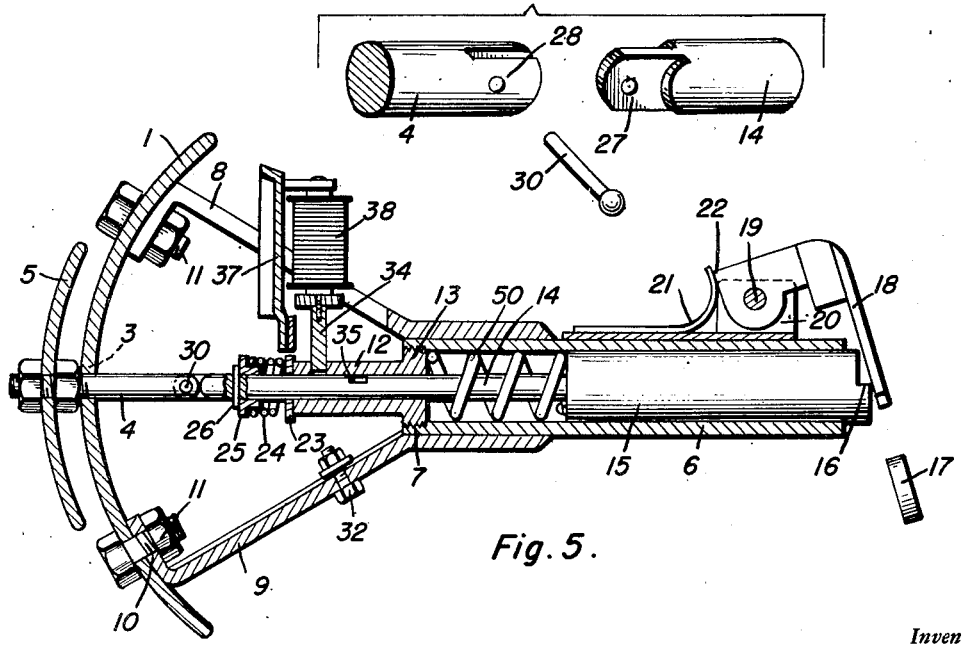
Inventor
McKenzie A. Beard
By Clarence A. O'Brien
and Harvey B. Jacobson
Attorneys Sept. 5, 1950     McKENZIE A. BEARD     2,521,562
HIT-AND-RUN DETECTOR Filed Aug. 8, 1947     3 Sheets-Sheet 3

*Inventor*
McKenzie A. Beard

By *Clarence A. O'Brien
and Harvey B. Jackson*
*Attorneys*

Patented Sept. 5, 1950

2,521,562

UNITED STATES PATENT OFFICE 2,521,562

HIT-AND-RUN DETECTOR

McKenzie A. Beard, Huntington, W. Va.

Application August 8, 1947, Serial No. 767,647

2 Claims. (Cl. 116—32)

This invention relates to improvements in hit and run detectors for motor vehicles.

An object of the invention is to provide an improved hit and run detector mechanism for motor vehicles which will automatically eject an identification disc or token when the vehicle thus equipped collides with or hits an object or vehicle in front of it.

Another object of the invention is to provide an improved hit and run detector mechanism for a motor vehicle attached to the front bumper assembly and being electrically connected with the ignition switch of a vehicle whereby the same will be ready for instant operation at all times the ignition switch is turned on, but will be locked when the vehicle is parked and the ignition switch is turned off.

A further object of the invention is to provide an improved hit and run detector mechanism disposable upon the front bumper of a motor vehicle and electrically connected with the ignition switch of said vehicle, whereby the device is locked and rendered inoperative at times the vehicle is parked and the ignition switch is turned off, but which is ready for instant operation at all times the ignition switch is turned on and the vehicle is in motion, whereby in the event the vehicle thus equipped collides with or strikes any object or another vehicle with its front bumper, an identification disc or token upon which the vehicle license number is impressed, will be automatically ejected to drop on the ground at the scene of the collision, so that should the driver of the vehicle drive away without stopping, a positive identification of the vehicle involved in the collision will be left at the place of collision to be found by the other party involved in the collision, or by the authorities.

A still further object of the invention is to provide an improved hit and run detector mechanism for motor vehicles which will be highly efficient in operation, and relatively inexpensive to manufacture and produce.

Other objects will appear as the description proceeds.

In the accompanying drawings which form a part of this application,

Figure 1 is a perspective view of a bumper with the improved hit and run detector mechanism attached thereto;

Figure 2 is a top plan view of the improved hit and run detector mechanism;

Figure 3 is a side elevation of the improved hit and run detector mechanism;

Figure 4 is a vertical sectional view through the improved hit and run detector mechanism showing the same connected with an ignition switch and in locked position;

Figure 5 is a vertical sectional view through the improved hit and run detector mechanism showing the same in unlocked position having just ejected an identification disc or token;

Figure 10 is an exploded view of the pivotal parts of the hit and run actuator rod which form the hinge connection between the front and rear portions thereof.

Like characters of reference are used through the following specification and the accompanying drawings to designate corresponding parts.

Figure 6:
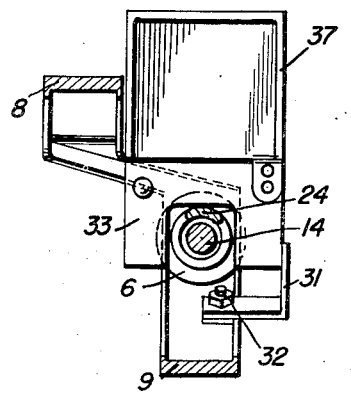
Figure 6 is a sectional view taken on the line 6—6 of Figure 2.
Figure 7:
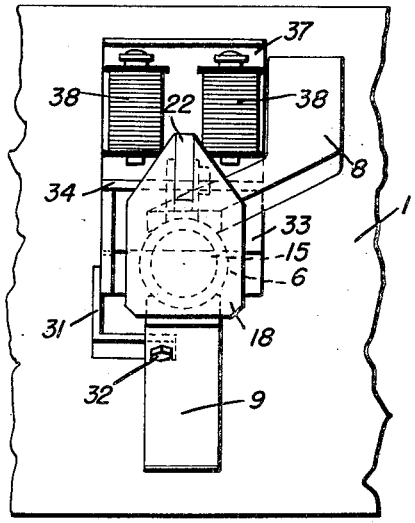
Figure 7 is a rear elevational view of the improved hit and run detector.
Figure 8:
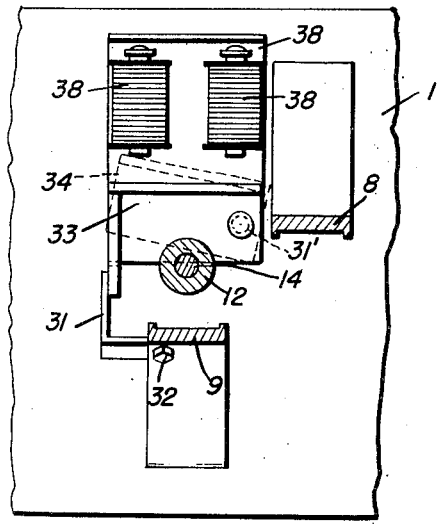
Figure 8 is a sectional view taken on the line 8—8 of Figure 2.
Figure 9:
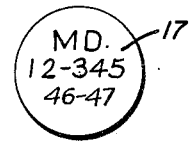
Figure 9 is a front elevation of an identification disc or token used in connection with the hit and run detector.

In carrying out the invention, there is provided an improved hit and run detector mechanism for motor vehicles adapted to be supported adjacent each end of the vehicle bumper 1 which is secured to the vehicle (not shown) by means of the usual supporting hangers or brackets 2.

The bumper 1 is of the usual form of construction being arcuate in vertical section, and is provided with the elongated slots 3 through its opposite ends through which the forward ends of the detector actuating rods 4 extend to support the transversely extending arcuate bumper or actuating rail 5.

The bumper or actuating rail 5 is adapted to extend in front of the main bumper 1 a short distance, so that in case any object or another motor vehicle is struck, the rail 5 will be projected or forced rearwardly toward the bumper 1 to operate the hit and run detector mechanism hereinafter more fully described.

The hit and run detector mechanism includes similar constructions mounted at the opposite ends of the bumper 1, and only one mechanism will be described in detail.

A horizontally disposed cylinder 6 will be internally threaded as at 7 at its forward end, and will be supported by the forwardly extending vertically flared supporting arms 8 and 9, preferably welded to said cylinder 6 at their rear ends and bent at their forward ends and apertured at 10 to receive the securing or attaching bolts 11 which also extend through the bumper 1 for supporting said hit and run device in position.

A cylindrical guide bushing 12 is provided with an externally threaded head 13 on its rear end for threadable engagement in the internally threaded forward end of the cylinder 6.

A piston or actuating rod 14 is slidably disposed through the guide bushing 12 and extends into the cylinder 6 to support the piston 15 on its rear or inner end. A coil spring 50 is disposed about the actuating rod 14 between the head 13 of the bushing 12 and the adjacent forward end of the piston 15. The rear end of the piston 15 is stepped or offset as at 16 to avoid binding of the piston during its operation.

An identification disc or token 17 is provided with indicia on its surface corresponding to the license number on the vehicle license tag and will be receivable in the rear end of the cylinder 6 next to the offset rear end 16 of the piston 15. A closure flap or door 18 will be pivotally supported upon the bearing or hinge pin 19 disposed between the spaced upstanding apertured ears 20 on the rear upper surface of the cylinder 6, and said closure flap or door 18 will be resiliently held in closed position by means of the leaf spring 21 secured at its forward end to the upper surface of the cylinder 6, and having its rear end resiliently engaging the bearing portion 22 of the closure flap or door 18.

A washer 23 is disposed about the actuating or piston rod 14 to abut the forward end of the guide bushing 12, and a coil tensioning spring 24 will be disposed about the rod 14 immediately in front of the washer 23 with its forward end being held in position by means of the flanged collar 25 disposed about said rod 14, and secured to the rod by means of the cross locking key 26 extending through the rod 14 forwardly thereof.

The forward end of the rod 14 will be reduced and cut away to form the centrally disposed forwardly projecting apertured ear 27 which will be received between the spaced apertured ears 28 on the rear end of the forward portion 4 of the actuating or piston rod, while the forward end of the rod 4 will extend through the aperture or slot 3 in the end of the bumper 1 to support the rail 5 in operative position. A hinge pin 30 will be disposed through the aperture in the ear 27 and through the aligned apertured ears 28.

A bracket support 31 is secured by the bolt 32 to the supporting brace 9, and supports the transversely slotted keeper member 33 in which the T-shaped locking armature 34 is disposed for pivotal movement on the pin 31'. In lowered position, the lower edge of the T-shaped locking armature 34 is adapted to seat in the notch 35 formed in the edge of the piston actuating rod 14 to retain the same inoperative position while the ignition switch 36 is open or turned off, thereby preventing an identification disc or token 17 from being ejected or lost while the vehicle (not shown) is parked and while the engine (not shown) therefore is not running.

A vertical supporting plate 37 will be secured in any desired manner to the slotted keeper member 33 and will support a pair of solenoids or electromagnets 38 which will be connected in series by the electric conductor 39 with the ignition switch 36 of the vehicle, and to the storage battery 40 and ground connection 41.

In operation, when the ignition switch 36 is turned off, the T-shaped locking armature 34 will be seated in the notch 35 to lock the hit and run detector mechanism in inoperative position. However, when the ignition switch 36 is closed, the electromagnets 38 will be energized to pull the pivoted T-shaped locking armature 34 from the notch 35, thereby leaving the parts of the mechanism in readiness to be instantly actuated in the event of a collision to eject an identification disc 17.

From the foregoing description, it will be apparent that there has been devised and provided a highly efficient form of hit and run detector mechanism which will be relatively inexpensive to manufacture and produce.

While the preferred embodiment of the instant invention has been illustrated and described, it will be understood that it is not intended to limit the scope of the invention thereto, as many minor changes in detail of construction may be resorted to without departure from the spirit of the invention.

Having described the invention, what is claimed as new is:

1. In combination, a vehicle bumper having an aperature therein, an elongated actuating rail, a rod having its front end adjustably connected to the rail and extending through said aperture to support the rail forwardly of said bumper for movement towards the same, a cylinder supported by said bumper, a resiliently tensioned closure member at the rear end of said cylinder, a guide bushing supported by said cylinder, an identification disc in the rear end of said cylinder, a piston in said cylinder and having a piston rod slidably mounted in said bushing, said piston having an offset rear end engageable with said disc, said rod being pivotally connected to the piston rod, a spring arranged coaxially of the piston rod to bias the rail outwardly from and forwardly of the bumper, for automatically ejecting said disc when said rail is forcibly engaged and moved toward said bumper.

2. The subject matter as claimed in claim 1, an aperture in said bushing, said rod having a locking notch in its surface and registrable with said aperture in the bushing when the rail is forward, and a latch member adapted to seat in said aperture in the bushing and said notch to lock said mechanism in inoperative position.

McKENZIE A. BEARD.

REFERENCES CITED

The following references are of record in the file of this patent:

UNITED STATES PATENTS

| Number | Name | Date |
|---|---|---|
| 1,648,784 | Roth et al. | Nov. 8, 1927 |
| 1,816,939 | Stangler | Aug. 4, 1931 |